Figure 1:
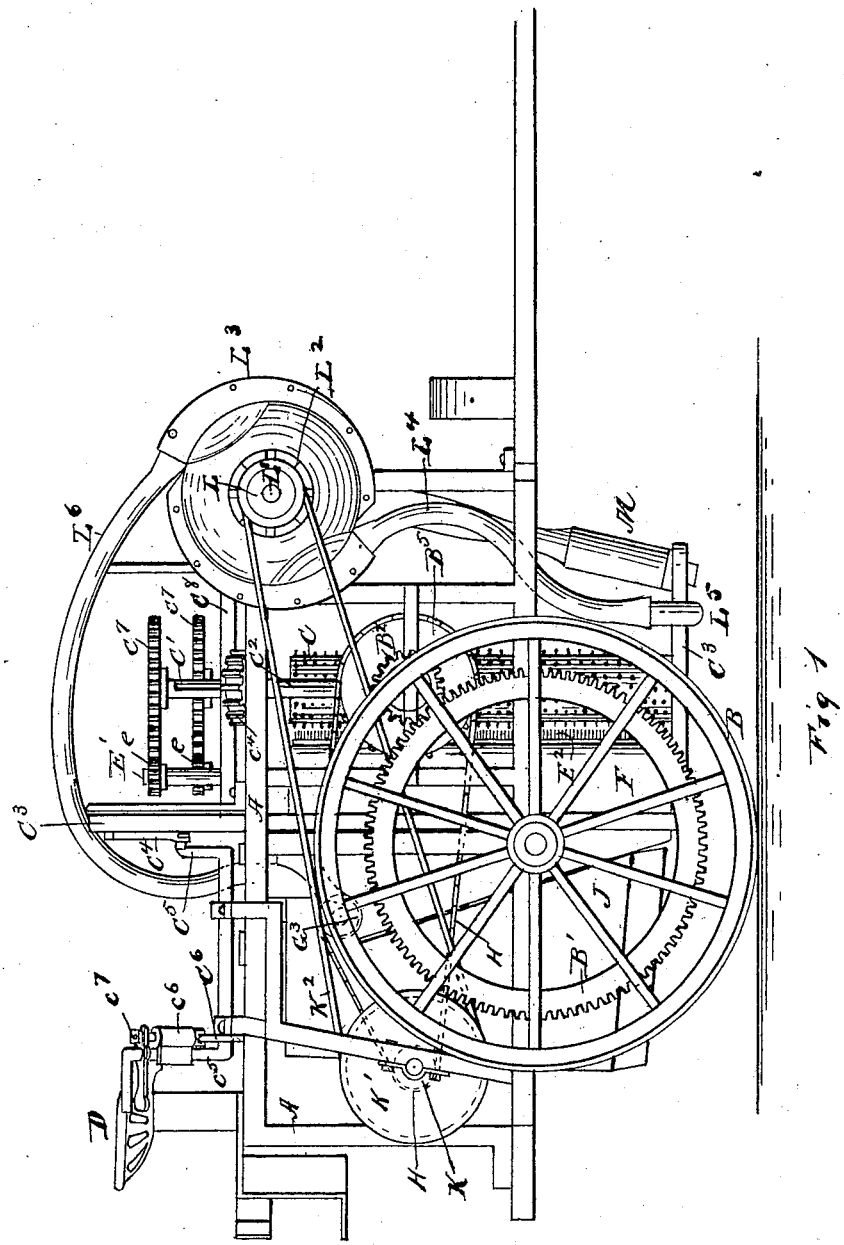

(Model.)

3 Sheets—Sheet 1.

C. D. LEACH.
COTTON HARVESTER.

No. 284,642.

Patented Sept. 11, 1883.

Witnesses
W. C. Corlies
A. M. Best

Inventor
Cornelius D. Leach
By Coburn & Thacher
Attorneys (Model.) 3 Sheets—Sheet 2.
C. D. LEACH.
COTTON HARVESTER.
No. 284,642. Patented Sept. 11, 1883.
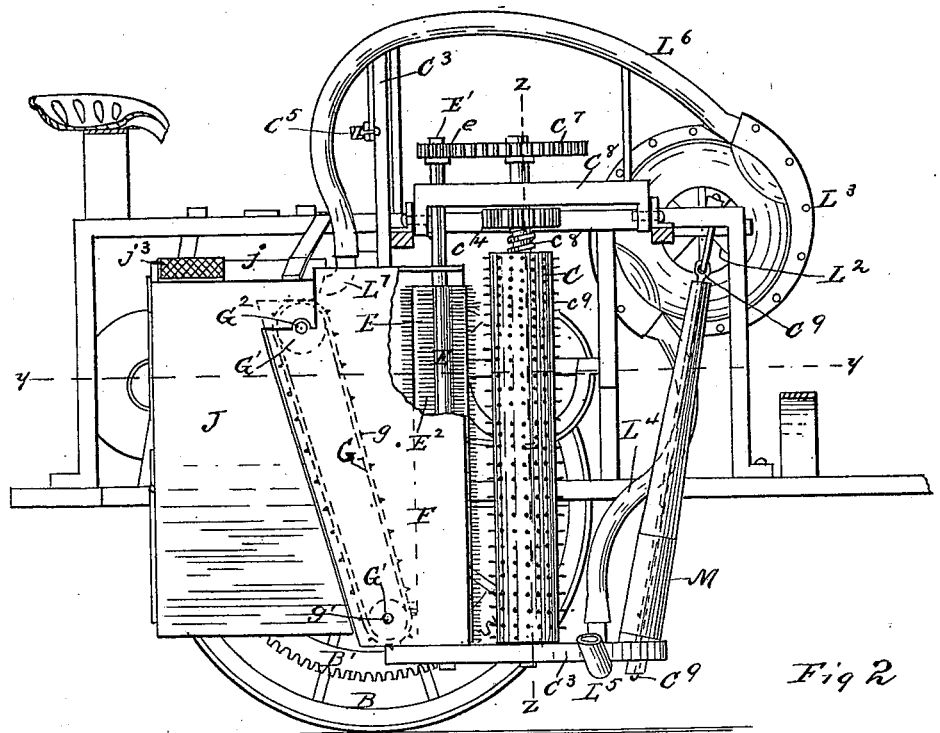
Fig 2
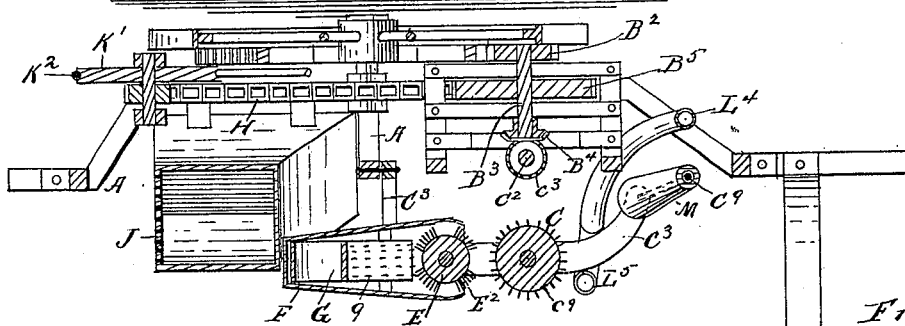
Fig 3
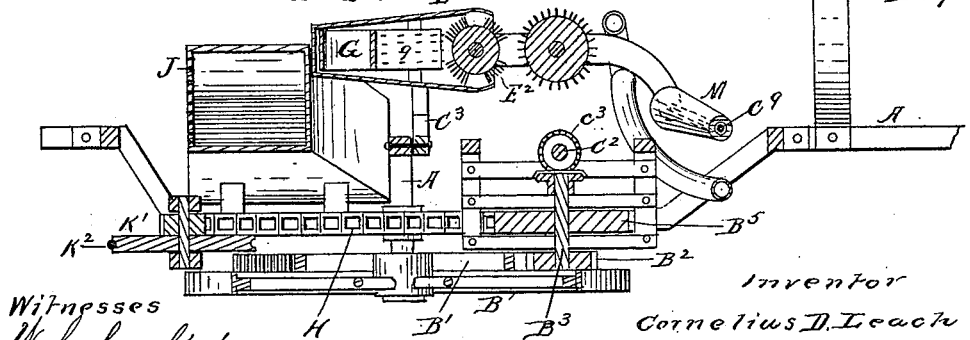
Witnesses
W. C. Coolies
A. M. Best
Inventor
Cornelius D. Leach
By Coburn & Thacher
Attorneys (Model.) 3 Sheets—Sheet 3.
C. D. LEACH.
COTTON HARVESTER.
No. 284,642. Patented Sept. 11, 1883.
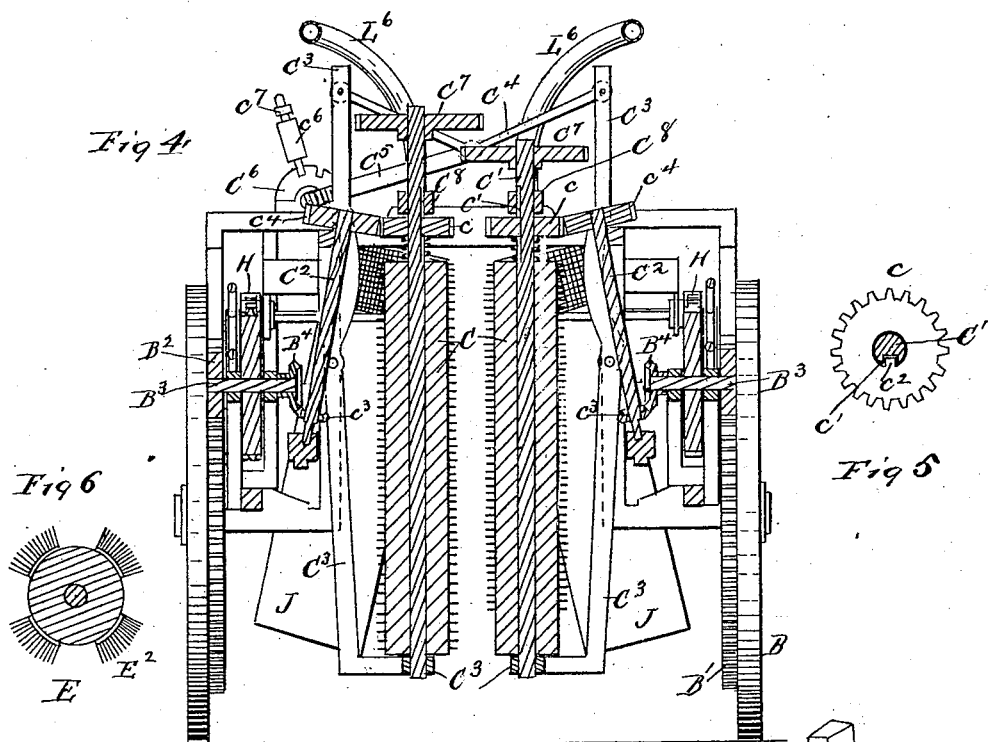
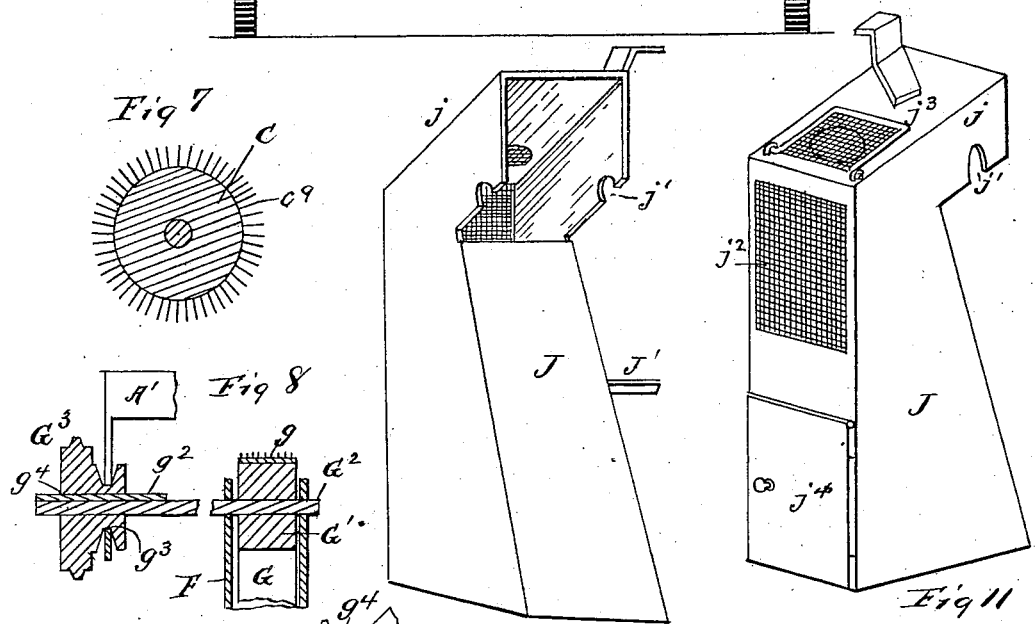
Witnesses
N. C. Corlies
A. M. Best
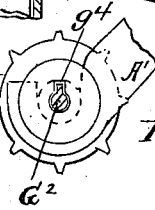
Inventor
Cornelius D Leach
By Coburn & Thacher
Attorneys
N. PETERS, Photo-Lithographer, Washington, D. C.

UNITED STATES PATENT OFFICE.

CORNELIUS D. LEACH, OF UNION CITY, MICHIGAN.

COTTON-HARVESTER.

SPECIFICATION forming part of Letters Patent No. 284,642, dated September 11, 1883.

Application filed May 7, 1883. (Model.)

*To all whom it may concern:*

Be it known that I, CORNELIUS D. LEACH, a citizen of the United States, residing at Union City, in the county of Branch, in the State of Michigan, have invented certain new and useful Improvements in Cotton-Harvesters, which are fully set forth in the following specification, reference being had to the accompanying drawings, in which—

Figure 1 is a side elevation of my improved cotton-picker. Fig. 2 is a vertical longitudinal section of the same. Fig. 3 is a section on the line $y\ y$ in Fig. 2. Fig. 4 is a section on the line $z\ z$ in Fig. 2. Fig. 5 is a detailed and enlarged view of the lower pinion of one of the picking-rollers. Fig. 6 is a detailed and enlarged cross-section of one of the brush-rollers. Fig. 7 is a similar section of one of the picking-rollers. Fig. 8 is a detailed and enlarged axial section of the gearing of the elevating-belt. Fig. 9 is a detailed and enlarged side elevation of one of the sprocket-wheels. Fig. 10 is a detailed and enlarged perspective front view of one of the cotton-receptacles. Fig. 11 is a similar back view of the same.

My invention relates to machinery for picking cotton; and it consists partly in one or more pairs of rollers adjustable at different angles to each other and at different distances apart, partly in guiding-rollers arranged in front of the picking-rollers, partly in revolving brushes parallel with the picking-rollers, partly in means for directing blasts of air upon the stalks in front of the picking-rollers and upon the elevating-belts which convey the picked cotton to the receivers, and partly in the several devices and combinations of devices, which will be fully set forth hereinafter, and pointed out definitely in the claims, the object being to facilitate the gathering of the stalks and removal of the cotton therefrom, to cleanse it from impurities before depositing it in the receptacles, and generally to promote convenience and perfection in the operation of the machine.

In the drawings, A denotes an open framework, in which the operative parts of the machine are mounted.

B denotes the wheels on which the machine is drawn across the field, preferably by two horses, one on each side of the row to be harvested. Each wheel carries on its inner face a toothed rim, B', of less diameter than the wheel. This rim may be fastened to the spokes in any convenient way. Its teeth engage with those of a pinion, B², rigidly set on a horizontal shaft, B³, which has a bearing in the frame-work A, and which carries on its inner end a beveled-gear wheel, B⁴. The teeth of this beveled-gear wheel engage with those of a similar but smaller wheel, $c^3$, rigidly set on a shaft, C², upright at its base, which has a bearing in the frame-work, but leaning slightly inward from a point a little above the wheel $c^3$ to its upper end, where it carries a pinion, $c^4$, whose teeth engage with those of a similar pinion, $c$, on the shaft C' of the corresponding picking-roller C. The pinion $c$ is attached to the shaft C' by means of a spline, $c^2$, projecting inwardly from the bearing-aperture of the pinion into a longitudinal groove, $c'$, in the shaft. This construction of the pinion is shown in Fig. 5 of the drawings; that of the shaft in Fig. 1. The shaft may thus have a longitudinal but no rotary motion through the pinion; hence the revolution of the pinion causes a revolution of the shaft, and thus the revolution of the traveling wheels B causes the two picking-rollers C to revolve toward each other. The two picking-rollers are upright or upwardly converging, according to the position of the two L-shaped frames C³, on the forward ends of whose horizontal members the shafts C', respectively, have their bearings. The upright member of each frame is pivoted, so that the frame oscillates laterally on one of the upright bars of the frame A, and its horizontal member its suspended at the forward end by a rod, C⁹, connected by links or swivel-joints with the main frame A above and with the oscillating frame C³ below. The upright members of the frames C³ are connected at their upper ends by a toggle, C⁴, whose knee is raised and lowered by the oscillation of a crank, C⁵. This crank has a transverse arm extending from one side of the machine to the middle, and there pivotally connected with the two arms of the toggle by means either of a short bend or of a pin. It has also a longitudinal arm having horizontal bearings in the frame-work A at one side of the machine. Just back of its bearings, and near the driver's seat D, it has an upright crank-shaped handle, $c^5$, by which it can be conveniently rocked, thereby lengthening or shortening the toggle to a greater or less extent, as may be desired, and thus bringing the upper ends of the frames $C^3$, and consequently of the picking-rollers C, more or less near to each other, so as to adapt their arrangement to plants of different height and spread. This arrangement of the picking-rollers may be continually varied by the driver as the machine traverses the field; or the rollers may be locked in any one position, inasmuch as the crank $C^5$ is so loosely mounted in its bearings that it may be shifted a little way back and forth. On the front of the upright arm of the handle $c^5$ is fastened a tube, $c^6$, containing a spring-catch, $c^7$, which tends to spring down into one of the notches of a rack, $C^6$, which is arranged just over the rear bearing of the crank $C^5$. In this position the crank cannot rock, and consequently the oscillating frames and picking-rollers remain fixed in whatever position they may have been brought to. The catch has a horizontal handle arranged just under the horizontal arm of the handle of the crank. By means of this it can be lifted out of the rack, and the crank being then drawn back a little, the catch will spring down behind the rack and will cease to interfere with the oscillation of the crank. When it is desired to lock the crank again, the catch is lifted and the crank moved forward till the catch is over the rack again, when it is allowed to drop into one of the notches. The backward and forward movement of the crank in its bearings is facilitated by setting the arms of the toggle $C^4$ a little loosely on their pivots and giving them room for a little play back and forth. The pinions $c$ are kept in their proper positions above the rollers C and close up to the oscillating yokes $C^8$, through which the shafts $C'$ pass, by coiled springs $c^8$, which are compressed by the upward motion of the shafts $C'$, through the pinions and the yokes, and react to hold the pinions up as soon as the shafts return. The toothed rims of the pinions $c$ are of sufficient breadth to keep them always engaged with the pinions $c^4$, notwithstanding their oscillation with the shafts $C'$. The picking-rollers carry laterally-projecting teeth $c^9$, which lay hold of the cotton, pull it from the bolls, and carry it around within reach of the brush-rollers E. These are arranged a little behind the picking-rollers, parallel with them, and their shafts $E'$ have similar bearings in the frames $C^3$ and yokes $C^8$. They receive a rotary motion in opposite directions to that of the corresponding picking-rollers, and much more rapid, by means of large gear-wheels $C^7$, rigidly set on the upper ends of the shafts $C'$, which engage with very small pinions $e$, similarly set on the shafts $E'$ of the brush-rollers.

To prevent any interference of the gear-wheels $C^7$, one of the shafts $C'$ extends a little farther up than the other, so that the wheels lap without touching each other. The pinions $e$ are of course correspondingly arranged on their shafts. The brushes $E^2$ extend from top to bottom of each brush-roller and cover about half its surface, alternating with bare strips of about equal width with the brushes, as shown in Fig. 7 of the drawings. The brushes have long bristles or wires, which thoroughly rake the spaces between the teeth of the picking-rollers and remove the cotton from them as fast as it is brought within reach of the brushes by the revolution of the picking-rollers. On account of the length of these wires or bristles, the brush-rollers themselves are of less diameter than the picking-rollers. Each brush-roller is inclosed (except in front, where it adjoins the corresponding picking-roller) in a case, F, which is of suitable size and shape to inclose also an elevating-belt, G, and the two wheels $G'$, on which it travels. The lower of these wheels is arranged a very slight distance behind the brush-roller, so that the teeth $g$ of the belt may rake between the bristles of the brushes. The upper wheel is arranged somewhat farther back, so that the course of the belt is upward and backward. The case is open immediately above and below the two belt-wheels, but is otherwise closed at top and bottom. The closed part at the top rises a little above the open part. The lower belt-wheel is journaled at $g'$ in the sides of the case F. The upper one has a shaft, $G^2$, which has bearings in the sides of the case, but also extends beyond the outer side of the case through a sprocket-wheel, $G^3$, which has a bearing in an arm, $A'$, projecting from the main frame-work. A box, $g^3$, is formed on the inner face of the wheel, and has at its inner end a radially-projecting flange. The smaller part of the box rests on the arm $A'$, and the flange of the box on the one side and the main disk of the sprocket-wheel on the other keep the wheel in its place on the arm. A spline, $g^2$, projecting from the shaft $G^2$ into a groove, $g^4$, in the inner circumference of the sprocket-wheel and its box, causes the wheel and the shaft to rotate together, while it allows the shaft to move longitudinally back and forth through the wheel. The box $g^3$ has its bearing on the arm $A'$ in a notch open at the top, so as to admit of the sprocket-wheel following the upward and downward though not the backward and forward motion of the shaft, both these motions resulting from the connection of the shaft with the case F, which is supported in the oscillating frame $C^3$. This construction is fully illustrated by Figs. 8 and 9 of the drawings. It will of course be understood that it is duplicated, like the picking and brush rollers and elevating-belts.

Each of the sprocket-wheels $G^3$ derives its motion from a drive-chain, H, which passes around a larger sprocket-wheel, $B^5$, rigidly set on the same shaft, $B^3$, as the gearing, which communicates rotary motion to the picking-rollers. The diameter of the wheels $B^5$ is equal to that of the gear-wheels C⁷, which cause the brush-rollers to revolve; hence the elevating-belt travels at the same rate as the brush-rollers. The teeth g of the elevating-belt are arranged in transverse rows on the outer surface of the belt, the rows being some considerable distance apart. That part of the elevating-belt which is opposite the brush-roller as it passes upward takes the cotton from the brush-roller and carries it to the top of the case F, where it is delivered to the corresponding receptacle, J.

One receptacle J is arranged immediately behind each case F. Its construction is shown in Figs. 10 and 11. It is in fundamental form a rectangular prism, whose height considerably exceeds the other dimensions. Its form is modified by the downward and forward slope of the forward side, to fit the case F, and by the horizontal projection of the upper part in the form of a hood, j, open at the front and bottom, which covers the open part of the top of the case F above the upper belt-wheel. The hood has notches j' in the lower edges of its sides, which fit loosely on the shaft g² of the belt-wheel. By means of brackets J' the receptacles are rigidly attached to the frame-work A at an inclination toward each other upwardly, the angle being equal to the greatest made by the frames C³, which support the rollers and elevating-belts. The receptacles are made considerably wider than the cases F, so that notwithstanding the oscillation of the latter the hoods j will always completely cover the open parts of the cases and be in position to receive the cotton from the belts.

Each drive-chain H, which turns the wheels of the elevating-belt, passes also around a small sprocket-wheel, K, which has bearings in the frame-work A at the rear of the machine. On the same shaft with this sprocket-wheel is rigidly set a large band-wheel, K', whose band K² passes around a pulley, L, rigidly set on a shaft, L', which has bearings in the frame-work at the forward end of the machine. This shaft carries a fan, L², which is thus made to revolve with great velocity. The fan-case L³ is rigidly supported on the frame A by means of brackets, and has two outlets. The lower communicates with a flexible tube, L⁴, which passes downward and terminates in a short tube, L⁵, rigidly attached to the forward part of the oscillating frame C³, just in front of the corresponding picking-roller C, and opening slightly upward and toward the opposite side of the machine. The two fans L² thus drive a blast of air from each side upon the plant just before it is brought within reach of the picking-rollers, and thereby remove the dust and other loose impurities from the plant and the bolls, and also tend to loosen the cotton in the bolls, so that it the more readily yields to the action of the picking-rollers. The upper outlet of each fan-case communicates with another flexible tube, L⁶, which terminates in a short tube, L⁷, passing through the closed top of the corresponding case, F, and bending into a horizontal direction, so as to direct a blast across the top of the elevating-belt G, and, through the hood j, into the receptacle J. This current of air induces an inward and upward current through the open space in the bottom of the case F, which latter current sweeps along the bare spaces of the brush-rollers and under the cotton on the ends of the brushes, so as to throw the cotton onto the elevating-belt. The spaces between the rows of teeth on the belt also expose the cotton after it has been caught by the teeth to the direct blast from the fan, and thus facilitate the conveyance of it into the receptacle. The back of each receptacle J is composed for the upper third of its height of a wire-gauze section, j², which affords an outlet for the blast. An opening in the top of the receptacle enables the operator from his seat to pack the cotton down with a rammer or other convenient means, and is covered by a trap-door, j³, which is also of wire-gauze or transparent material, so that he can see when the receptacle is full. It can then be emptied through a door, j⁴, in the lower part of the back.

The suspension-rods C⁹, which support the forward ends of the oscillating frame C³, carry guiding-rollers M, which operate to direct the plant between the picking-rollers. Each roller is loosely mounted in its suspension-rod, so as to turn readily when it comes in contact with the plant.

What I claim as my invention, and desire to secure by Letters Patent, is—

1. In a cotton-harvester, the vertical picking-rollers C, in combination with the laterally-adjustable frames C³ and yokes C⁸, the vertical bearing of the vertical rollers being adjustable in said yokes, all as shown and described.

2. The stationary frame A, the oscillating frames C³, pivotally supported therein, the toggle C⁴, connecting the upper ends of the oscillating frames, and the crank C⁵, pivotally attached to the knee of the toggle, all in combination, substantially as and for the purpose described.

3. The shaft C', mounted in an oscillating frame and having the longitudinal groove c', in combination with the pinion c, arranged to engage with stationary gearing, but mounted on the shaft, and attached thereto by means of the spline c², arranged to enter the groove, substantially as and for the purpose described.

4. The oscillating shafts C', in combination with the oscillating yokes C⁸, supporting their upper ends, the pinions c, mounted on the shafts below the yokes, so as to allow of a longitudinal motion relatively to the shafts, and automatic means for holding the pinions close to the yokes, substantially as and for the purpose described.

5. In a cotton-harvester, the main frame, a pair of oscillating frames arranged side by side therein, means under the control of the operator for oscillating or locking them, a picking-roller, a brush-roller, and an elevating-belt arranged in bearings on each frame, and automatic means for communicating to the rollers and belts corresponding rotary motions from the traveling wheels of the machine, all in combination, substantially as and for the purpose described.

6. The brush-roller, the elevating-belt G, arranged in juxtaposition thereto, the inclosing-case F, open at the front of the roller and at the ends of the belt, but otherwise closed, the receptacle J, of suitable shape to fit over the opening at the delivery end of the belt, and having an air-outlet arranged opposite to that opening, means for giving to the roller and the belt correspondent rotary motions, and means for forcing an air-blast across the delivery end of the belt, all in combination, substantially as and for the purpose described.

7. In a cotton-harvester, the fan, means for rotating it, the fan-case $L^3$, having upper and lower outlets, and tubes continuing the outlets, respectively, to the end of the delivery apparatus and the front of the picking-rollers, all in combination, substantially as and for the purpose described.

8. In a cotton-harvester, the receptacles J, each having an opening in the top with a transparent removable cover, substantially as and for the purpose described.

9. The shaft $G^2$, mounted in the oscillating case F, and having a spline, $g^2$, in combination with the wheel $G^3$, having a stationary bearing, and provided with the groove $g^4$, arranged to receive the spline, substantially as and for the purpose described.

CORNELIUS D. LEACH.

Witnesses:
J. C. LEONARD,
J. W. SPENCER.